United States Patent [19]

Zyhowski et al.

[11] Patent Number: 4,689,170

[45] Date of Patent: Aug. 25, 1987

[54] WATER DISPLACEMENT COMPOSITION

[75] Inventors: Gary J. Zyhowski, Hamburg, N.Y.; Francis J. Figiel, Boonton, N.J.

[73] Assignee: Allied Corporation, Morris Township, Morris County, N.J.

[21] Appl. No.: 856,891

[22] Filed: Apr. 28, 1986

[51] Int. Cl.$^4$ .............................................. C09K 3/00
[52] U.S. Cl. .............................. 252/194; 252/DIG. 9; 252/364
[58] Field of Search .................. 252/194, 171, DIG. 9, 252/364

[56] References Cited

U.S. PATENT DOCUMENTS

| | | | |
|---|---|---|---|
| 3,336,232 | 8/1967 | Bauer et al. | 252/153 |
| 3,340,199 | 9/1967 | Clay et al. | 252/171 |
| 3,386,181 | 6/1968 | Steinacker | 34/9 |
| 3,559,297 | 2/1971 | Figiel | 34/9 |
| 3,589,023 | 6/1971 | Figiel | 34/9 |
| 3,710,450 | 1/1973 | Figiel | 34/9 |
| 3,846,327 | 11/1974 | Schofield | 252/DIG. 9 |
| 4,401,584 | 8/1983 | Tajkowski et al. | 252/194 |
| 4,438,026 | 3/1984 | Tajkowski | 252/548 |

OTHER PUBLICATIONS

"Cool-Dry TM " Product Information Article by Metal Coatings International (1985).

*Primary Examiner*—John F. Terapane
*Assistant Examiner*—Matthew A. Thexton
*Attorney, Agent, or Firm*—Jay P. Friedenson

[57] ABSTRACT

A composition is disclosed comprising a low additive-water removal mixture consisting of a solution of about 0.15 to 0.01 weight percent phosphate ester free acid surfactant n an azeotropic composition of about 99.0 to 99.5 weight percent trichlorotrifluoroethane or trichloromonofluoromethane and about 1.0 to 0.5 weight percent t-amyl alcohol. A phosphate ester free acid surfactant that is commercially available and contains mixtures of both mono and diesters is incorporated. This mixture exhibits high solubility in the binary, azeotropic mixture and effectiveness even at low concentration. The concentration of said surfactant is about 100 ppm or 0.010 percent. The preferred binary system comprised of 99.25 to 99.50 weight percent of trichlorotrifluoroethane and 0.75 to 0.50 weight percent of t-amyl alcohol has a boiling point of about 47.2° C. at barometric pressure of about 751.6 mm Hg.

4 Claims, No Drawings

WATER DISPLACEMENT COMPOSITION

FIELD OF THE INVENTION

The present invention relates to improved compositions for removal of water from the surface of non-absorbent articles. More particularly the invention involves a low additive (surfactant) water removal composition having improved wettability characteristics through a mechanism of dissolving said surfactant in an azeotropic mixture of solvents comprised of trichlorotrifluoroethane or trichloromonofluoromethane and t-amyl alcohol. The composition demonstrates improved stability over known compositions with regard to pH, in that its phase separation is not affected in a pH range of 4 to 11.

BACKGROUND OF THE INVENTION

Various drying compositions are known in the prior art. These compositions contain various kinds and various amounts of surfactants and other additives. Specifically, the concentration of surfactants added to chlorocarbon and chlorofluorocarbon solvents, such as, methylene chloride and 1,1,2-trichloro-1,2,2-trifluoroethane typically are in amounts of 500 ppm or greater.

Such relatively large quantities of surfactant are a drawback in the elimination of residues, of which the cleaned surface must be free, for various applications such as in the semiconductor field.

Another drawback in various compositions that have been utilized in the prior art is attributable to the changing composition of the water displacement composition as the composition absorbs, or is depleted of a portion of ingredients. With respect to amounts of surfactant, a decreased surfactant level provides for shortened process time in that less non-volatile material (surfactant) is carried from the drying and displacing sump of a surfactant dryer to the rinse sump and hence requires a shorter rinse time to wash off the surfactant that was carried over.

The use of an azeotropic mixture improves solvent wettability in the liquid and vapor zones of a typical solvent dryer. Though the lifetime of the enhanced wettability can be affected by the susceptibility of the azeotropic mixture to water, the composition should be less affected by water than such components known in the prior art (U.S. Pat. Nos. 3,559,297; 3,589,023; and 3,710,450) and provide enhanced wettability over a longer lifetime. Improvement of conservation of desirable phase separation rates, with no emulsion formation, over a pH range of 4 to 11 is also an important consideration. Some systems of the prior art incorporate surfactants that can be rendered ineffective by reaction with water in extremes of pH or by reaction with metal ions to form water-extractible soaps. (U.S. Pat. Nos. 3,386,181 and 4,401,584.) Such systems typically operate where the pH of water to be removed is between 5 and 9.

It is thus apparent that a need exists for an improved water displacement composition which avoids the above drawbacks in that it results in less residue and requires less rinse time, avoids emulsion formation and is substantially more stable and resistant to composition change.

SUMMARY OF THE INVENTION

It is a primary object of the invention to provide a water removal composition that functions at a low additive level and enhanced wettability. It is a more particular object of the invention to provide a constant boiling 1,1,2-trichloro-1,2,2-trifluoroethane or trichloromonofluoromethane drying composition which leaves minimal residue on articles dried with this composition and which because of the low solubility of water therein permits a more complete phase separation.

Another object of the invention resides in the provision of a composition that removes water where the pH of the water is in the range of about pH 4 to about pH 11.

The composition of the low additive-water removal mixture of the invention consists of a solution of about 0.15 to 0.01 weight percent phosphate ester free acid surfactant in an azeotropic composition of about 99.0 to 99.5 weight percent trichlorotrifluoroethane or trichloromonofluoromethane and about 1.0 to 0.5 weight percent t-amyl alcohol. The phosphate ester free acid surfactants employed in the invention are commercially available and contain mixtures of both mono and diesters.

The hydrophobic base may be either aromatic or aliphatic. Although various phosphate ester free acid mixtures are commercially available, we have discovered that the complex phosphate ester free acid surfactants of the ethylene oxide adduct type are the preferred surfactants. Examples of such surfactants are GAFAC RM-410 and GAFAC RL-210 of GAF Corp. Such mixtures exhibit high solubility in the binary, azeotropic mixture and effectiveness even at low concentration. The recommended and preferrable concentration of said surfactant is about 100 ppm or 0.010 percent. The preferred binary system comprised of 99.25 to 99.50 weight percent of trichlorotrifluoroethane and 0.75 to 0.50 weight percent of t-amyl alchol has a boiling point of about 47.2° C. at barometric pressure of about 751.6 mm Hg.

DETAILED DESCRIPTION OF THE INVENTION

In accordance with the invention, the water immiscible organic solvent incorporates a minor amount of a cosolvent t-amyl alcohol in an amount of from about 1.0 to about 0.5 weight percent based on the total solvent that is employed as the composition of the invention. "Water-immiscible solvent" is intended to include solvents in which water is not soluble therein an amounts of more than above 0.1% by weight of the solvent. Such solvent has a boiling range of 35°-49° C., a density within the range of 1.4 to 1.6 g/cc at 20° C., and does not form an azeotropic system containing more than about 0.1% of water.

This binary solvent generally contain a surfactant to aid in displacement of water from articles to be dried. The surfactant is characterized as being soluble is solvent and at most only dispersible in water. A phosphate ester free acid surfactant which supports the displacement of water by the solvent is suitable.

The phosphate ester-free acid surfactants which are preferably employed are the complex phosphate ester free acid surfactants of the ethylene oxide adduct type. These anionic products are mixtures of mono diester, e.g.

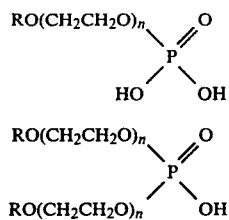

wherein R is an alklaryl radical of three to nine carbon atoms; and n is an integer of 2–10 representing moles of ethylene oxide reacted with one mole of these materials which introduce a hydrophobic property. Preferably, 3–5 moles of ethylene oxide are reacted with one mole of the hydrophobic compound.

The "hydrophobe" or "hydrophobic group", as noted, comprises an alkyl group of three to nine carbon atoms, attached to an aromatic nucleus such as benzene or naphthalene. The preferable hydrophobe is an alkyl phenol especially nonyl phenol.

Surfactant concentration may range from 150 ppm to 500 ppm, but a concentration between 50 and 500 ppm is preferred. It is further preferred that surfactant concentration be 100 ppm.

The presence of certain alcohols, e.g. t-amyl alcohol improves the wettability of the solvent and hence aids in the removal of water without contribution to nonvolatile residue in the solvent. It is also preferred that the alcohol form a constant-boiling composition with the solvent.

The constant-boiling composition should contain between 0.1 and 3.0% by weight of alcohol and preferably between 0.1 and 1.0% by weight of alcohol. The constant-boiling behavior is desired to maintain wettability characteristics in both liquid and vapor phases of the solvent composition during use (and to avoid buildup of alcohol in the boiling sump of a typical solvent dryer). It is further preferred that the alcohol be t-amyl alcohol at a composition between about 0.5 and 0.75% by weight.

The invention will be further described by the following specific examples. It should be understood, however, that although these examples may describe in detail certain preferred operating conditions of the invention they are given primarily for purposes of illustration and the invention in its broader aspects is not limited thereto.

EXAMPLE 1

Constant Boiling Behavior of 1,1,2-Trichloro-1,2,2-Trifluoroethane, t-Amyl Alcohol

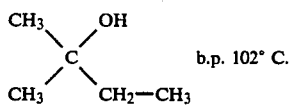

b.p. 102° C.

In order to maintain the contribution of wettability provided by a volatile additive such an an alcohol, throughout the liquid and vapor zones of a typical drying apparatus, the volatile additive and base solvent must form a constant boiling mixture. Thus, 1719 grams of a mixture of 1.0% by weight t-amyl alcohol in 1,1,2-trichloro-1,2,2,-trifluoroethane was charged to a 3 liter boiling flask fitted with an 24" Vigreaur column and manual Allihn relfux head. The mixture was allowed to reflux for one hour before distilling over any material.

The boil up rate was 8 ml/minute. The first overhead cut, 200 ml in volume, was discarded. A 30 minute period of total reflux was provided between cuts. The next three cuts were anlayzed by gas chromatography and then recombined as feed for a second distillation. Cut size, head temperatures, and barometric pressure are given in Table I of this example. The average composition in the overheads was around 0.44% by weight tertiary amyl alcohol.

TABLE I

First distillation of t-amyl alcohol and 1,1,2-trichloro-1,2,2-trifluoroethane
CUT COMPOSITION

| CUT # | CUT VOLUME, ml | HEAD TEMPERATURE, % C. | T-AMYL ALCOHOL % WT. |
|---|---|---|---|
| 2 | 200 | 47.8 | 0.41 |
| 3 | 200 | 48.1 | 0.39 |
| 4 | 200 | 48.1 | 0.52 |

Barometric Pressure = 754.1 mm Hg at 24.5° C.

The bottom portion was discarded. The recombined cuts 2, 3, and 4 were charged to the same apparatus as above and a second distillation performed in the same manner. Analysis of the distillation cuts was performed by gas chromatography. Results appear in Table IA of this example.

TABLE IA

Analysis of distillation cut, second distillation of t-amyl alcohol and 1,1,2-trichloro-1,2,2-trifluoroethane
CUT COMPOSITION

| CUT # | CUT WEIGHT, GRAMS | HEAD TEMPERATURE, °F. | t-AMYL ALCOHOL, % WT. |
|---|---|---|---|
| 2 | 115.6 | 47.2 | 0.23 |
| 3 | 114.4 | 47.2 | 0.26 |
| 4 | 114.9 | 47.2 | 0.32 |

Barometric Pressure = 751.6 mm Hg @ 21.0° C.
Average Boil-up rate = 15.5 ml/min.

It can be seen from data in Tables I and IA of this example that t-amyl alcohol forms a constant boiling composition with 1,1,2-trichloro-1,2,2-trifluoroethane at about 0.2 to 0.75% by weight of t-amyl alcohol.

EXAMPLE 2

The ability of a solvent to preferentially wet a substrate that is already wet with water was characterized using the method below. A deionized water droplet of measured volume was released from a 10 microliter syringe with the resulting droplet adhering to the end of the needle. The needle was immersed just beneath the surface of given solvent composition that was held in a beaker at 99° F. Immediate removal of the needle followed. The process required a smooth motion of one second duration. The droplet volume that would release to the solvent composition surface was recorded. It is apparent in Table II that the addition of certain alcohols to 1,1,2-trichloro-1,2,2-trifluoroethane increases the ability of the solvent to wet a substrate already wet with water.

TABLE II

Enhanced wettability of
1,1,2-trichloro-1,2,2-trifluoroethane
using certain alcohols

| SOLVENT COMPOSITION % WEIGHT | WATER DROPLET RELEASED (microliters) |
| --- | --- |
| (1) 1,1,2-trichloro-1,2,2-trifluoroethane 1) | 0.20 |
| (2) 0.54% isobutanol in 1) | 0.05 |
| (3) 0.22% n-butanol in 1) | 0.10 |
| (4) 0.5% isopropanol in 1) | 0.10 |
| (5) 0.3% t-amyl alcohol in 1) | 0.15 |
| (6) 0.5% t-amyl alcohol in 1) | 0.10 |

EXAMPLE 3

The method used to determine water displacement times given in Table III is described below. Clean stainless steel screws, 1"×⅛", roundhead, were used as received. Alumina ceramic slides, 1.5"×1.5", were found to be 100% water wettable as acquired, hence were not cleaned prior to use. To ensure a 100% water wettable surface on 1"×3" glass slides, said slides were soaked overnight in a solution of water, ammonia, methanol and detergent. The slides were then rinsed consecutively with deionized water, acetone, and methanol and allowed to air dry.

A 500 ml glass beaker was charged with 400 ml of drying solvent and heated to boiling on a ceramic hot plate. Parts to be dried were first immersed in deionized water and then in boiling drying solvent. The time required to remove water from the part was recorded. In Table III, five additive packages were evaluated for their ability to impart water displacement capabilities to a base solvent; here, 1,1,2-trichloro-1,2,2-trifluoroethane. In the case of two of the additive packages, each when combined with 1,1,2-trichloro-1,2,2-trifluoroethane constitutes a commercially available water displacement solvent as described in Table III, under "Solvent Composition". It was in this manner that the commercial materials were used. Also shown in Table III is the water displacement from glass, alumina ceramic, and stainless steel to demonstrate the composition of the invention in time frames comparable to existing commercial formulations.

TABLE III

Effectiveness of Water Removal
Time Required to Remove Water, Seconds

| Solvent Composition | Stainless Steel Screws | | Alumina Ceramic | | Glass Slides | | |
| --- | --- | --- | --- | --- | --- | --- | --- |
| | Trial 1 | Trial 2 | Trial 1 | Trial 2 | Trial 1 | Trial 2 | Trial 3 |
| 1,1,2-trichloro-1,2,2-trifluoroethane with | | | | | | | |
| 100 ppm phosphate ester free acid surfactant (2) and 0.54% isobutanol | 3 | 2 | 9 | 10 | 20 | 25 | 26 |
| 100 ppm phosphate ester free acid surfactant (2) and 0.22% n-butanol | 5 | 5 | 15 | 15 | 26 | 20 | 21 |
| alkyl phosphate ester neutralized with saturated aliphatic amine (3) (commercially as DuPont Freon ® TDFC) | 2 | 2 | 10 | 10 | 5 | 10 | 5 |
| 0.25% sarcosine surfactant (4) (Commercially as Allied GENESOLV ® DRM) | 5 | 5 | 105 (1) | 195 (1) | 85 | 195 | 240 (1) |
| 100 ppm phosphate ester free acid and surfactant (2) and 0.5% t-amyl alcohol | 2 | 2 | 49 | 50 | 34 | 39 | Not Run |

(1) Not dry, trial discontinued
(2) Commercially as GAFAC RM-410, GAF Corp.
(3) 0.05 to 3.0% by weight of a mixture of mono-oxo-octyl and di-oxo-octyl phosphates or a mixture of mono(tridecyl) and bis(tridecyl) phosphates or a mixture of mono- and di-n-octyl and mono- and di-n-decyl phosphates neutralized with 2-ethylhexylamine or other suitable amines as disclosed in U.S. Pat. No. 3,386,181
(4) N—lauryl sarcosine. However, N—cocyl or N—oleoyl sarcosine and mixtures may also be used as disclosed in U.S. Pat. No. 4,401,584.

EXAMPLE 4

Solubility of Water in Water Removal Compositions

Increased solubility of water in water removal solvents affects drying and dryer performance by prohibiting complete phase separation of water from solvent, increasing the tendency to form emulsions and necessarily allowing more water to inhabit the vapor zone of a dryer. Table IV illustrates the solubility of water in various drying solvent compositions. A microburet was used to titrate deionized water into 50 ml of drying solvent at room temperature. The buret tip was held beneath the solvent surface. The solvent was stirred using a magnetic stirrer. The volume of water added that caused cloudiness was taken to be the limit of solubility. Here in Example 4, as in Example 3, the combinations of 1,1,2-trichloro-1,2,2-trifluoroethane and the five additive packages of Table IV were tested as water displacement solvents. In the case of two such packages, the combinations with the above mentioned chlorofluorocarbon results in two commercially available water displacement solvents shown in Table IV under "Solvent Composition" and were used in this example.

TABLE IV

SOLUBILITY OF WATER IN WATER REMOVAL COMPOSITIONS

| Solvent Composition | Volume of deionized water required to generate cloudiness, ml |
|---|---|
| 1,1,2-trichloro-1,2,2-trifluoroethane with . . . | |
| 100 ppm phosphate ester free acid surfactant (1) and 0.5% t-amyl alcohol | 0.4 |
| 100 ppm phosphate ester free acid surfactant and 0.54% isobutanol | 0.4 |
| 100 ppm phosphate ester free acid surfactant and 0.22% n-butanol | 0.4 |
| Alkyl phosphate ester, amine salt (2) (DuPont Freon ® TDFC) | 0.5 |
| 0.25% sarcosine surfactants (3) (Allied Genesolv ® DRM) | 1.2 |

(1) GAFAC RM-410, GAF Corp.
(2) 0.05 to 3.0% by weight of a mixture of mono-oxo-octyl and di-oxo-octyl phosphates or a mixture of mono(tridecyl) and bis(tridecyl) phosphates or a mixture of mono- and di-n-octyl and mono- and di-n-decyl phosphates neutralized with 2-ethylhexylamine or other suitable amines as disclosed in U.S. Pat. No. 3,386,181.
(3) N—lauryl sarcosine. However, N—cocoyl or N—oleoyl sarcosine and mixtures may also be used as disclosed in U.S. Pat. No. 4,401,584.

EXAMPLE 5

Extractibility of Volatile Wetting Agents from 1,1,2-Trichloro-1,2,2-Trifluoroethane by Water To illustrate the ability of the composition of the invention to maintain volatile wetting agent composition in the presence of water, the following test was conducted:

Equal volumes of water and 1,1,2-trichloro-1,2,2-trifluoroethane with volatile wetting agent, totaling 100 ml, were shaken for 1 minute in a separatory funnel. The mixture was allowed to phase separate. Gas chromatographic analysis was performed to determine the amount of volatile wetting agent remaining in the organic phase. From Table V, it is notable that the composition of the invention shows less change compared to other known volatile wetting agents suitable in such a water removal composition.

TABLE V

Extraction of volatile wetting agents from 1,1,2-trichloro-1,2,2-trifluoroethane by water

| Initial Wetting Agent Composition, % by Wt. in 1,1,2-trichloro-1,2,2-trifluoroethane | % Wt/Wetting Agent composition in 1,1,2-trichloro-1,2,2-trifluoroethane After Extraction with Water |
|---|---|
| 0.50% tertiary amyl alcohol | 0.18% tertiary amyl alcohol |
| 0.50% isobutanol | 0.09% isobutanol |
| 0.50% n-butanol | 0.09% n-butanol |
| 0.50% isopropanol | 0.02% isopropanol |

EXAMPLE 6

Phase Separation and Emulsion Formulation of Drying Solvents with Water in the pH Range of 4 to 11

Hydrolysis or soap formation of certain surfactants found in solvent/surfactant water removal systems can be facilitated by extremes in pH of the water introduced. Such hydrolysis products and soaps can result in either decreased phase separation rates or even in emulsions, both of which adversely affect drying performance. To mark the stability of the composition of the invention, various dyring solvent compositions were washed with an equal volume of deionized water in which pH was adjusted to 4.0, 7.0, or 11.0 using appropriately either 0.01 normal hydrochloric acid or 0.01 normal sodium hydroxide. Phase separation rates and emulsion formation were noted.

As in Examples 3 and 4, in this example referred to in Table VI, the performance combination of a chlorofluorocarbon solvent with fine separate additive package is shown. In two cases, the resultant combinations are commercially available products and as shown in Table VI were used in this evaluation.

It is apparent from Table VI of this example that phase separation of the composition of the invention is not adversely affected by the pH of the water to be removed, when the water is of a pH of between 4.0 and 11.0. No emulsion formulation was noted for the composition of the invention. Adverse effects found for the systems used are noted in Table VI.

TABLE VI

Effect of pH on Phase Separation

| pH of water | |
|---|---|
| 1,1,2-trichloro-1,2,2-trifluoroethane with . . | pH 7.0 |
| 0.22% n-butanol and 100 ppm complex phosphate ester free acid surfactant (1) | forms 3 phases takes 24 hrs. to break, overnight |
| 0.54% isobutanol and 100 ppm complex phosphate ester-free acid surfactant (1) | phase separates in 30 seconds |
| 0.50% t-amyl alcohol with 100 ppm comples phosphate ester-free acid surfactant (1) | phase separates in 15 seconds |
| 0.25% sarcosine surfactants (Genesolv ® DRM, Allied Corp.) | forms 3 phases, takes greater than 60 seconds to break |
| alkyl phosphate ester neutralized with a saturated aliphatic amine (Freon ® TDFC, E. I. duPont deNemours, Inc.) | phase separation does not occur even when held overnight |
| | pH 4.0 |
| 0.22% n-butanol and 100 ppm complex phosphate ester free acid surfactant (1) | as for pH = 7.0 |
| 0.54% isobutanol and 100 ppm complex phosphate ester-free acid surfactant | as for pH = 7.0 |
| 0.50% t-amyl alcohol with 100 ppm complex phosphate ester-free acid surfactant (1) | as for pH = 7.0 |
| 0.25% sarcosine surfactants (Genesolv ® DRM, Allied Corp.) | phase separaters in 30 seconds |
| alkyl phosphate ester neutralized with a saturated aliphatic amine (Freon ® TDFC, E. I. duPont deNemours, Inc.) | as for pH = 7.0 |
| | pH 11.0 |
| 0.22% n-butanol and 100 ppm complex phosphate ester free acid surfactant (1) | as for pH = 7.0 |
| 0.54% isobutanol and 100 ppm complex phosphate ester-free acid surfactant (1) | three phases takes overnight to break |
| 0.50% t-amyl alcohol with 100 ppm complex phosphate ester-free acid surfactant (1) | phase separates in 40 sec. |
| 0.25% sarcosine surfactants (Genesolv ® DRM, Allied Corp.) | three phases, takes greater than 60 sec. to break |
| alkyl phosphate ester neutralized with a saturated aliphatic amine (Freon ® TDFC, E. I. duPont deNemours, Inc.) | as for pH = 7.0 |

(1) GAFAC RM-410, GAF Corporation
(2) 0.05 to 3.0% weight of a mixture of mono-oxy-octyl and di-oxo-octyl phosphates or a mixture of mono(tridecyl) and bis(tridecyl) phosphates or a mixture of mono- and di-n-octyl and mono- and di-n-decyl phosphates neutralized with 2-ethylamine or other suitable amines as disclosed in U.S. Pat. No. 3,386,181.
(3) N—lauryl sarcosine. However, N—cocoyl or N—oleoyl sarcosine and mixtures may also be used as disclosed in U.S. Pat. No. 4,401,584.

It is to be understood that changes and variations may be made without departing from the spirit and scope of the invention as defined in the appended claims.

What is claimed is:

1. A composition for removal of water moisture from the surface of articles comprising: a binary azeotropic composition comprising
   (a) a fluorocarbon selected from the group consisting of trichloromonofluoromethane and 1,1,2-trichloro-1,2,2-trifluorethane and
   (b) from about 1.0 to about 0.5 percent by weight based on the weight of (a) of t-amyl alcohol;
and from about 50 ppm to about 200 ppm of an ethylene oxide adduct phosphate ester free acid surfactant.

2. The composition of claim 1 wherein the binary azeotropic composition is comprised of 99.25 to 99.50 weight percent of (a) 0.75 to 0.50 weight percent of (b) and having a boiling point of about 47.2° C. at a barometric pressure of about 751.6 mm Hg.

3. The composition of claim 1 wherein the surfactant comprises a mixture of mono and diester hydrophobes of the formula:

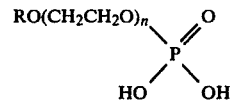

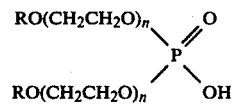

wherein R is alklaryl radical and n represents from 2 to 10 moles ethylene oxide reacted with one mole of the hydrophobe.

4. The composition of claim 1 wherein the fluorocarbon is 1,1,2-trichloro-1,2,2-trifluoroethane.

* * * * *